ANALOG TO DIGITAL TIME BASE ENCODER

Filed Dec. 29, 1961 3 Sheets-Sheet 1

INVENTORS
CHARLES L. COHEN
OTTO L. SAXILD
BY
Bernard N. Wiener
ATTORNEY

Jan. 11, 1966 C. L. COHEN ETAL 3,229,272

ANALOG TO DIGITAL TIME BASE ENCODER

Filed Dec. 29, 1961 3 Sheets-Sheet 2

United States Patent Office 3,229,272
Patented Jan. 11, 1966

3,229,272
ANALOG TO DIGITAL TIME BASE ENCODER
Charles L. Cohen, Endicott, and Otto L. Saxild, Apalachin, N.Y., assignors to International Business Machines Corporation, New York, N.Y., a corporation of New York
Filed Dec. 29, 1961, Ser. No. 163,356
6 Claims. (Cl. 340—347)

Figure 1:
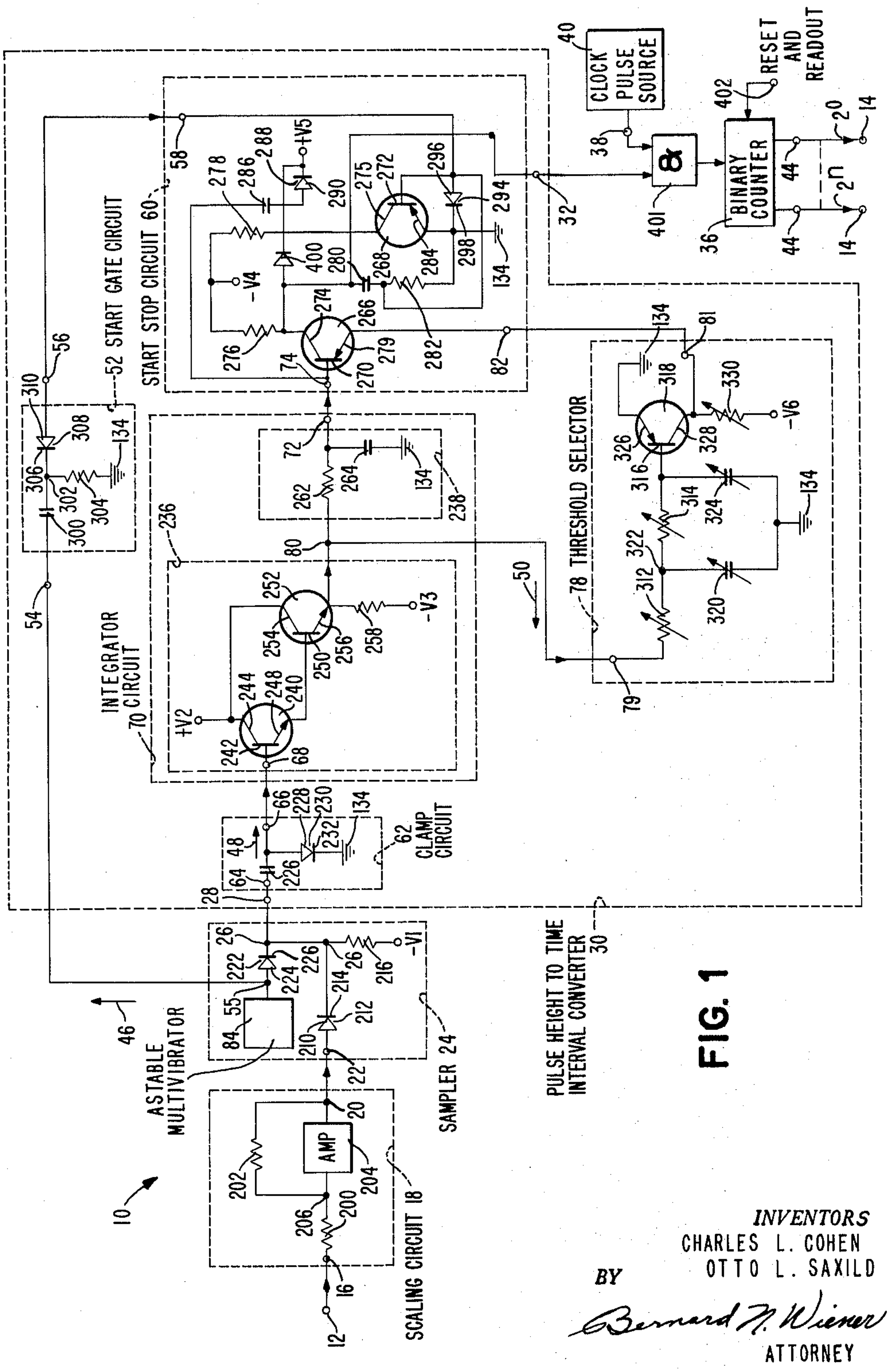
Figure 2:
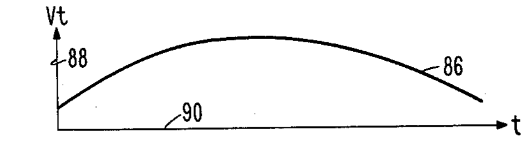
Figure 3:
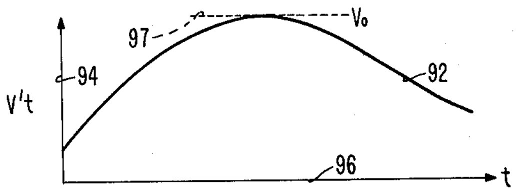
Figure 4:
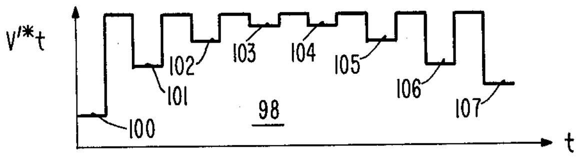
Figure 5:
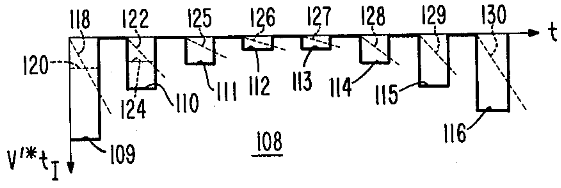

This invention relates generally to analog parameter to digital information converters and relates particulaly to an analog to digital time base encoder utilizing pulse height to time interval conversion.

An instantaneous state of a physical system may be represented by an analog parameter or by digital information. Illustratively, a state of a physical system may be the velocity of a moving object, the analog parameter may be a voltage and the digital information may be a binary number or a particular voltage pulse sequence. An analog to digital converter provides output binary information related to particular sequential samples of an input analog parameter. An analog to digital time base encoder provides output pulse numerical information from intermediate time interval information related to the sequential samples.

The intermediate time interval information may be obtained by a pulse height to time interval conversion technique. Pulse height to time interval conversion implies that a pulse height related to a sampled value of an analog parameter is converted to a representative time interval.

A prior art electrical analog time base encoder includes means for sampling analog voltage information periodically, a ramp voltage generator and comparison means for establishing a time interval over which the ramp voltage reaches the energy level of the analog voltage sample. The circuitry thereof is complex and the time interval defined is critically related to the determination of the start of the ramp. As most physical parameter pulses have an uncertain start, the time interval determined by the prior art electrical encoder is usually somewhat uncertain in accuracy. In addition, the prior art electrical encoder involves considerable complex circuitry.

It is often desirable to multiplex several signals to an analog to digital converter. To multiplex signals to a device connotes that at least two signals are imparted thereto via a switching means and information concerning each signal is obtained.

It is the prime object of this invention to provide a pulse height to time interval converter in which the level of pulse height energy is utilized to produce a ramp voltage whose slope is related to the energy level and in which the time interval is defined by the intersection of the ramp voltage and a threshold voltage level.

It is a second object of this invention to provide an electrical analog to digital time base encoder in which sequential analog voltage samples are utilized to produce respective ramp voltages and the intersection of each ramp voltage with a pre-selected threshold voltage level defines a time interval and the time interval is quantized by a counter which counts clock pulses during the time interval.

It is a third object of this invention to provide an analog to digital converter capable of multiplexing a plurality of analog voltage information signals.

It is a fourth object of this invention to provide an analog to digital function generator.

It is a fifth object of this invention to provide an analog to digital random number generator.

The foregoing and other objects, features and advantages of the invention will be apparent from the following more particular description of a preferred embodiment of the invention, as illustrated in the accompanying drawings.

Figure 8:
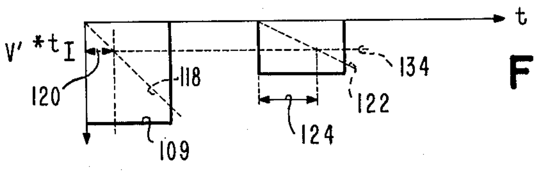
Figure 9:
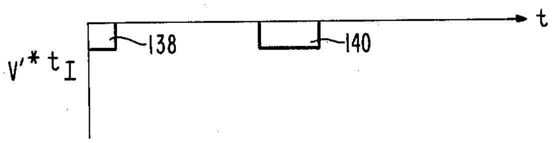
Figure 10:
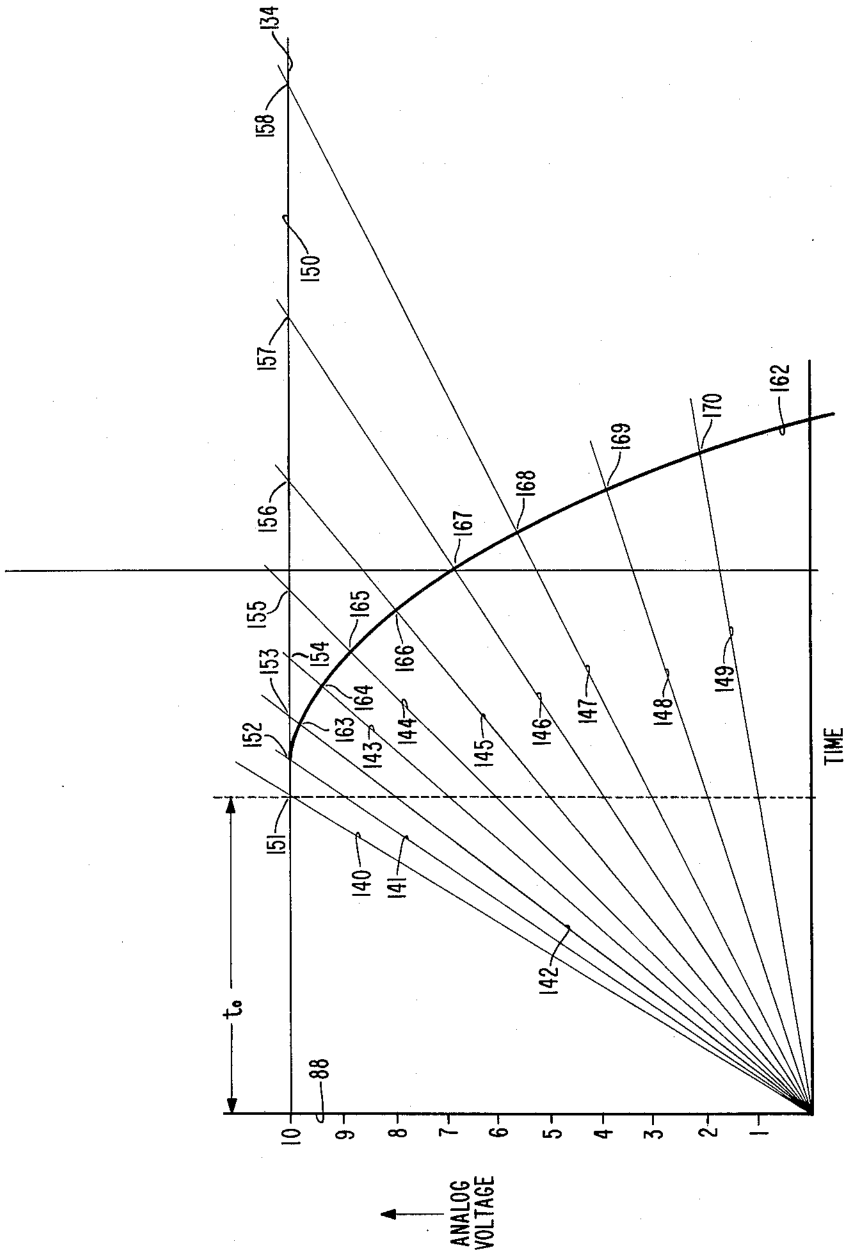

In the drawings:

FIGURE 1 is a block and schematic diagram of a circuit suitable for the practice of this invention;

FIGURES 2 to 9 present waveforms illustrating the manner in which a pulse height is converted to a corresponding time interval by circuitry in accordance with this invention; and FIGURE 10 illustrates the manner in which a hyperbolic function is generated in accordance with this invention.

The analog to digital time base encoder in accordance with this invention includes means for sampling the input analog voltage at particular intervals for providing respective step voltage pulses. Each voltage pulse height is introduced to an integrator circuit which provides a ramp voltage whose slope is representative of the voltage pulse height. The integrator circuit has a time constant such that a substantially linear ramp voltage is obtained for the duration of the sampling interval. Therefore, the slope of the ramp voltage is directly proportional to the amplitude of the step voltage. Included in the encoder circuitry is a threshold establishing means for terminating the ramp voltage at a pre-selected voltage level thereby establishing a time interval related to the voltage pulse height. Circuitry is provided whereby a counter is started running at the time the analog voltage is sampled. The counter is stopped when the ramp voltage reaches the pre-selected threshold value. A clock pulse source is coupled to the counter and the number of clock pulses counted during the established time interval is the digital number which corresponds to the magnitude of the input analog voltage at the sample point.

FIG. 1 presents a block and schematic diagram of an embodiment 10 of this invention for encoding an analog voltage into a representative digital number. With regard to the block diagram, analog to digital time base encoder 10 comprises analog voltage input terminal 12 and digital information output terminals 14. The analog voltage input terminal 12 is connected to the input terminal 16 of scaling circuit 18. The output terminal 20 of scaling circuit 18 is connected to the input terminal 22 of sampler circuit 24. The output terminal 26 of sampler circuit 24 is connected to the input terminal 28 of pulse-height to time interval converter 30. The output terminal 32 of pulse-height to time interval converter 30 is connected to the binary counter 36 via And logic block 401. The output terminal 38 of clock pulse source 40 is also connected to And logic block 401 for incrementing the binary counter 36. Output terminals 44 of binary counter 36 are connected to digital information output terminals 14. Suitable signals for resetting and unloading the counter 36 are applied to terminal 402 by conventional means at a time following the closing of And logic block 401 as will be further apparent.

Pulse-height to time interval converter 30 includes start gate circuit path 46, integrator circuit path 48 and threshold selector path 50 which are indicated respectively by numbered arrows. Start gate circuit path 46 includes start gate circuit 52 whose input terminal 54 is connected to multivibrator terminal 55 of sampler 24. The output terminal 56 of start gate circuit 52 is connected to start gate circuit terminal 58 of start-stop circuit 60. Integrator circuit path 48 includes clamp circuit 62 whose input terminal 64 is connected to pulse-height to time converter 30 via input terminal 28. The output terminal 66 of clamp circuit 62 is connected to input terminal 68 of integrator circuit 70. Output terminal 72 of integrator circuit 70 is connected to input circuit terminal 74 of start-stop circuit 60. Output terminal 76 of start-stop circuit 60 is connected to output terminal 32 of pulse height to time converter 30.

Threshold selector path 50 includes threshold selector 78 whose input terminal 79 is connected to output terminal 80 of integrator circuit 70. Output terminal 81 of threshold selector 78 is connected to input terminal 82 of start-stop circuit 60.

The block diagram operation of the analog to digital time base encoder 10 of FIG. 1 will be understood through reference to FIGS. 2 to 9. An analog voltage 86 is applied to analog voltage input terminal 12. Analog voltage 86 has voltage magnitude $v(t)$ vertical axis 88 and occurence time $t$ horizontal axis 90. Analog voltage 86 is introduced to input terminal 16 of scaling circuit 18. Scaling circuit 18 provides at its output terminal 20 scaled analog voltage 92, FIG. 3, which is related at every point thereof to the respective point of analog voltage 86 by a constant multiplying factor. Scaled analog voltage 92 has voltage magnitude $v'(t)$ vertical axis 94 and occurrence time $t$ horizontal axis 96. Scaled analog voltage 92 has maximum voltage $V_0$ indicated by horizontal line 97. Scaled analog voltage 92 is applied to sampler circuit input terminal 22 of sampler circuit 24. Astable multivibrator 84 of sampler circuit 24 provides a sequence of positive going sampling pulses, not shown, whose maximum value is at least as large as $V_0$, FIG. 3. Sampler circuit 24 provides at sampler output terminal 26 the sample voltage pulses 98 of FIG. 4 with voltage axis $v'^{*}(t)$ Sample voltage pulses 98 include sequential sample voltage pulses 100 to 107. The leading edge of each sampling pulses from multivibrator 84 actuates start gate circuit 52 which provides a gate pulse which in turn initiates the action of start-stop circuit 60.

Sample voltage pulses 98 are clamped to ground by clamp circuit 62 to establish voltage pulse heights 108. Clamp circuit 62 presents at clamp circuit output terminal 66 the negative going pulse train 108 of FIG. 5 referenced to ground. The voltage scale for pulse train 108 is $v'^{*}(t)_I$ where (′) indicates the variable is already scaled, (*) indicates the variable is sampled, ($t$) indicates the variable is a function of time, and I indicates that the variable is inverted. Negative going pulse train 108 includes sequential pulses 109 to 116. The leading edge of negative pulse height 109 initiates integrator circuit 70 to provide ramp voltage signal 118. Ramp signal 118 is terminated at threshold voltage level 120. A variable threshold level is selected in a manner described below with reference to FIG. 10 to obtain a binary output linearly related to the analog voltage 86 input. Ramp voltage 122 for negative pulse height 110 is terminated at threshold voltage level 134. Similarly, ramp voltage 125 to 130 related to pulse heights 109 to 116, respectively, are terminated at threshold voltages, not shown.

Figure 6:
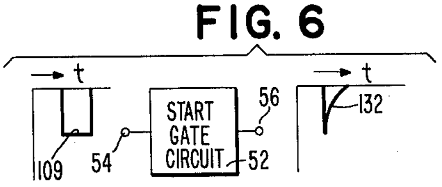

FIG. 6 illustrates the performance of start gate circuit 52. The leading edge of the multivibrator 84 output pulse corresponding to negative going pulse 109 is introduced to start gate circuit terminal 54 and negative going voltage spike 132 is presented by start gate circuit 52 at its output terminal 56.

Figure 7:
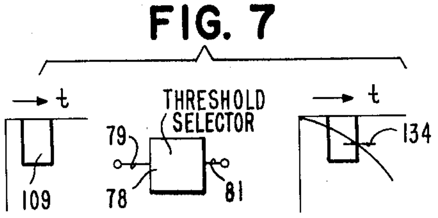

FIG. 7 presents the operation of threshold selector 78. Negative going pulse height 109 is introduced to threshold selector 78 on input terminal 79 thereof. Threshold selector 78 presents threshold voltage level 134 on its output terminal 81.

FIG. 8 illustrates in greater detail the nature of and use for the ramp voltage, e.g., 118, generated by integrator circuit 70 when a constant threshold voltage level 134 is utilized. Time interval 120 is defined by the intersection of ramp 118 with threshold level 134. Time interval 124 is defined by the intersection of ramp 122 with threshold level 134.

FIG. 9 illustrates the various output time gates developed by the negative going pulses and ramp voltages of FIG. 8. Gate pulse 138 exists during time interval 120 and gate pulse 140 exists during the time interval 124. Gate pulses 138 and 140 at input terminal 34 of binary counter 36 determine how long it counts for the corresponding pulse heights 109 and 110.

FIG. 10 illustrates the manner in which a constant threshold voltage level for each ramp voltage associated with a sample pulse causes a hyperbolic function to be provided on digital information output terminal 14 of encoder 10, FIG. 1. It also illustrates how a variable threshold voltage level in accordance with a hyperbolic function causes encoder 10 to provide a binary output on terminal 14 which linearly related to the analog voltage 86 on input terminal 12. The vertical axis 88 is the magnitude $v(t)$ of the analog voltage while the horizontal axis 90 is time $t$. Illustrative ramp voltages 149 to 149 establish progressively longer time intervals from the time axis 90 origin and correspond respectively to progressively greater energy levels of the input analog voltage 86, i.e., they do correspond to the particular negative pulse heights of FIG. 5. Ramp voltage 140 to 147 intersect threshold voltage 134 at points 151 to 158, respectively. The intersections of ramp voltages 159 and 160 with threshold voltage level 134 are not shown as their locations are off the drawing. It is apparent that the corresponding time intervals from the origin of the time axis 90 for points 151 to 158 increase in valve respectively. It can be shown that this increase is a hyperbolic function given by the expression $t=K/V$, where $t$=time, $K$=threshold voltage in volts times the RC time constant of integrator circuit 70 and V is the amplitude of the sample pulse height in volts. If the horizontal threshold voltage 134 is replaced by a threshold voltage level which follows curve 162, the time intervals between adjacent intersections 151, 152 and 163 to 170 are of equal value.

It will be readily apparent to one skilled in the art that various functions can be obtained by varying the nature of the threshold voltage curve 162. For those curves 162 which have a particular geometrical configuration, the output sequences will be specifically determined mathematically. However, if a particular time sequence is desired which can not be represented by a linear function, then the nature of curve 162 is readily determined by experiment. Encoder 10, FIG. 1, is a random number generator if the voltage input on input terminal 12 has random values.

The particular circuits utilized for a preferred embodiment of this invention will be described with respect to the schematic diagram of FIG. 1. Scaling circuit 18 includes resistors 200 and 202 and operational amplifier 204. One end of resistor 200 is connected between input terminal 16 and input terminal 206 of operational amplifier 204. Resistor 202 is connected between input terminal 206 of operational amplifier 204 and output terminal 20 of scaling circuit 18. The operational amplifier 204 of scaling circuit 18 has a scaling factor $Rs/Rin$ where R$in$ is resistor 200 and R$s$ is resistor 202.

Sampler circuit 24 has its input terminal 22 connected to the anode 210 of diode 212 whose cathode is connected to sampler output terminal 26. Resistor 216 is connected between terminal 26 and negative voltage source —V1. Output terminal 55 of astable multivibrator is connected to anode 222 of diode 224. Cathode 226 of diode 224 is connected to output terminal 26 of sampler circuit 24. Analog voltage 86, FIG. 2, applied to scaling circuit 18 on its input terminal 16 is scaled to scaled analog voltage 92, FIG. 3. Through the use of scaling circuit 18, it is possible to scale the input analog voltage 86 up or down in accordance with the capacity of the ensuing circuitry. Multivibrator 84 produce negative going sequential pulses, not shown, whose magnitude must be sufficient to sample the greatest negative going excursion of the analog voltage. Diodes 212 and 224 comprises an AND circuit whose output follows the most positive voltage applied thereto. Thus, the output pulses, not shown, from multivibrator 84 sample scaled voltage 92. The outputs of sampler 24 are pulse heights.

Clamp circuit 62 comprises capacitor 226 connected between clamp circuit input terminal 64 and anode 228 of diode 230 whose cathode 232 is connected to ground 134. The junction of capacitor 226 and diode 230 is clamp circuit output terminal 66. Clamp circuit 62 clamps sampled analog voltages 98 of FIG. 4 to ground and establishes pulse heights 108, FIG. 5. Integrator circuit 70 includes isolation portion 236 and integrator portion 238. Isolation portion 236 comprises NPN transistor 240 whose base 242 is connected to clamp circuit output terminal 66 and whose collector 244 is connected to positive voltage source +V2. Emitter 248 of transistor 240 is connected to base 250 of NPN transistor 252. Collector 254 of transistor 252 is connected to positive voltage source +V2 and emitter 256 thereof is connected to integrator circuit threshold selector terminal 80. Resistor 258 is connected between emitter 256 to negative voltage source —V3. Isolation circuit 236 is an impedance matcher and permits integrator portion 238 to integrate each pulse height applied thereto without loading down the previous circuitry.

Integrator portion 238 includes resistor 262 connected between terminal 80 and integrator circuit output terminal 72. Capacitor 264 is connected between terminal 72 and ground 134. Integrator portion 238 is an RC integrating network which provides a ramp voltage output for a step voltage input.

Start-stop circuit 60 includes PNP transistors 266 and 268. Base 270 of transistor 266 is connected to start-stop circuit input terminal 74 and base 272 of transistor 268 is connected to output terminal 76 via capacitor 280. Collectors 274 and 275 of transistors 266 and 268 are connected to negative voltage source —V4 via resistors 276 and 278, respectively. Collector 274 of transistor 276 is connected to source +V5 by way of clamping diode 400. Input terminal 74 is connected to diode 288 via capacitor 286. Collector 274 of transistor 266 is also connected via the series path of capacitor 280 and resistor 282 to emitter 284 of transistor 268. Emitter 284 is connected to ground 134. Collector 275 of transistor 268 is also connected via diode 288 to positive voltage source +V5. Start-stop circuit input terminal 58 is connected to the base 272 of transistor 268. Diode 294 is connected between base 272 and emitter 284 of transistor 268. Its anode 296 is connected to the base 272 and its cathode 298 is connected to the emitter 284.

Start gate circuit 52 includes capacitor 300 connected to start gate circuit input terminal 54 and junction 302. Resistor 304 is connected between junction 302 and ground 134. Variable capacitor 324 is connected between junction 302 and the anode 310 thereof is connected to start gate circuit output terminal 56.

Stop threshold selector circuit 78 includes the series path of variable resistors 312 and 314 connected between threshold selector input terminal 79 and the base 316 of PNP transistor 318. Variable capacitor 320 is connected between the junction 322 of resistors 312 and 314 and ground 134. Variable capacitor 324 is connected between the base 316 of transistor 318 and ground 134. Emitter 326 of transistor 318 is connected to ground 134 and the collector 328 thereof is connected via variable resistor 330 negative voltage source —V6. Collector 330 is also connected to threshold selector output terminal 81.

Certain aspects of the operation of the analog to digital time base encoder of FIG. 1 will now be described in greater detail. The start gate circuit 52 differentiates the waveform from multivibrator 84 thereby producing a negative gate pulse which causes transistor 268 of start-stop circuit 60 to turn on. This initiates the running of binary counter 36 which counts the clock pulses from clock pulse source 40. The input to integrator portion 238 is also fed into threshold selector 76 which establishes an approximate hyperbolic waveform at its output terminal 81. Through adjustment of the variable resistors and variable capacitors of threshold selector 78 it generates the approximate hyperbolic waveform.

Transistor 268 of start-stop circuit 60 continues to conduct until the ramp voltage at input terminal 74 of start-stop circuit 60 is just slightly negative with respect to the approximate hyperbolic function waveform from threshold selector 78 at its input terminal 82. At this time transistor 266 of start-stop circuit 60 turns on and the change in voltage at its collector 274 turns off the binary counter 36. Transistor 268 is turned off by feedback action via capacitor 280 and resistor 282.

As result of the foregoing operation, binary counter 36 contains a digital number representative of the time interval related to the sample pulse height of the input analog voltage.

While the invention has been particularly shown and described with reference to a preferred embodiment thereof, it will be understood by those skilled in the art that various changes in form and details may be made therein without departing from the spirit and scope of the invention.

What is claimed is:

1. A signal amplitude to time conversion means comprising:
means to receive an input signal for conversion;
means for providing a reference signal of known amplitude;
comparator means for subtracting the amplitude of said input signal from said reference signal so that a relatively large signal amplitude provides a relatively small signal level in the output thereof and a relatively small signal amplitude provides a relatively large signal level in the output thereof;
integrator means for generating a ramp signal having a slope which is related to the signal level applied thereto by said subtracting means;
threshold generating means for generating a signal level representative of the amplitude of said input signal;
detector means responsive to the ramp output of said integrator means and to said threshold level signal to detect when said ramp integrator output signal bears a preselected relationship with said threshold level signal;
means responsive to said detecting means for measuring the time required for said ramp signal from said integrator means to reach said preselected relationship representing the time conversion of said input signal applied to said subtracting means.

2. Conversion means according to claim 1 wherein:
said threshold signal generating means generates a signal level to provide a linear relationship between the amplitude of said input signal and the time required for said ramp signal of said integrator means to reach said preselected relationship.

3. Conversion means according to claim 1 wherein:
said threshold signal generating means generates a signal level to provide a nonlinear relationship between the amplitude of said input signal and the time required for said ramp signal of said integrator means to reach said preselected relationship.

4. An analog to digital conversion system comprising:
means to receive an analog input signal varying in time for conversion;
a sampling gate source;
a sampling means responsive to said sampling gate source and said means to receive an analog input signal for sampling the amplitude of said input signal;
a binary counter;
a relatively high frequency clock pulse source;
start-stop gating means electronically disposed between said relatively high frequency clock pulse source and said binary counter;

said start-stop gating means being responsive to said sampling gate source so as to initiate the counting of said relatively high frequency clock pulses in said binary counter in response to the leading edge of the signal output of said sampling gate;

a signal amplitude-to-time conversion means comprising:

means for providing a reference signal of known amplitude;

means for subtracting the amplitude of said input signal from said reference signal so that a relatively large signal amplitude provides a relatively small signal level in the output thereof and a relatively small signal amplitude provides a relatively large signal level in the output thereof;

integrator means for generating a ramp signal having a slope which is related to the signal level applied thereto by said subtracting means;

threshold generating means for generating a signal level representative of the amplitude of said input signal;

a detector means responsive to the ramp output of said integrator means and to said threshold level signal to detect when said integrated output signal bears a preselected relationship with said threshold signal level;

means responsive to said detecting means for generating a stop signal for application to said start-stop gating means for the purpose of stopping the application of said relatively high frequency clock pulses to said binary counter such that the number stored in said counter is representative of the amplitude of said input signal.

5. A conversion system according to claim 4 wherein said means supplying the threshold signal comprises:

electronic means for deriving a linear relationship between the amplitude of the output signal of said sampling means and the time required for the amplitude of said ramp signal of said integrating means to reach said preselected relationship.

6. A conversion system according to claim 4 wherein said means for supplying the threshold signal comprises:

electronic means for deriving a preselected non-linear relationship between the amplitude of the output signal of said sampling means and the time required for the amplitude of said ramp signal of said integrator means to reach said preselected relationship.

References Cited by the Examiner

UNITED STATES PATENTS

| | | | |
|---|---|---|---|
| 2,897,486 | 7/1959 | Alexander et al. | 340—347 |
| 2,963,697 | 12/1960 | Giel | 340—347 |

MALCOLM A. MORRISON, *Primary Examiner.*

D. M. ROSEN, L. W. MASSEY, K. R. STEVENS, *Assistant Examiners.*